United States Patent
Uliyar et al.

(10) Patent No.: US 9,705,595 B2
(45) Date of Patent: Jul. 11, 2017

(54) METHOD AND APPARATUS FOR OPTICAL COMMUNICATION

(71) Applicant: Nokia Corporation, Espoo (FI)

(72) Inventors: Mithun Uliyar, Bangalore (IN); Basavaraja Sv, Bangalore (IN); Gururaj Gopal Putraya, Bangalore (IN); Pushkar Prasad Patwardhan, Maharashtra (IN)

(73) Assignee: Nokia Corporation, Espoo (FI)

( * ) Notice: Subject to any disclaimer, the term of this patent is extended or adjusted under 35 U.S.C. 154(b) by 56 days.

(21) Appl. No.: 14/736,340

(22) Filed: Jun. 11, 2015

(65) Prior Publication Data
US 2015/0365167 A1    Dec. 17, 2015

(30) Foreign Application Priority Data
Jun. 13, 2014 (IN) .......................... 2907/CHE/2014

(51) Int. Cl.
| H04N 5/232 | (2006.01) |
| H04B 10/116 | (2013.01) |
| H04N 5/238 | (2006.01) |
| H04N 5/235 | (2006.01) |

(52) U.S. Cl.
CPC .......... H04B 10/116 (2013.01); H04N 5/238 (2013.01); H04N 5/2353 (2013.01); H04N 5/23212 (2013.01)

(58) Field of Classification Search
CPC .... H04N 5/235; H04N 5/238; H04N 5/23212; H04N 5/2353; H04B 10/116
See application file for complete search history.

(56) References Cited

U.S. PATENT DOCUMENTS

| 2003/0058262 A1* | 3/2003 | Sato ....................... G06F 3/147 345/690 |
| 2005/0052751 A1* | 3/2005 | Liu ...................... G02B 3/0012 359/626 |
| 2007/0091197 A1* | 4/2007 | Okayama ............. G02B 3/0056 348/340 |
| 2012/0076509 A1 | 3/2012 | Gurovich et al. ............ 398/212 |
| 2013/0128081 A1 | 5/2013 | Georgiev et al. .......... 348/240.2 |

\* cited by examiner

*Primary Examiner* — Abdelaaziz Tissire
(74) *Attorney, Agent, or Firm* — Harrington & Smith

(57) ABSTRACT

A method, apparatus and computer program for controlling a digital microlens array camera to obtain a sequence of images each including microimages captured by respective microlenses; for determining in each of the images a set of diffused microimages in which an optical communication light source is diffused over each of the microimages of the set; and for decoding optically communicated information from the set.

17 Claims, 4 Drawing Sheets

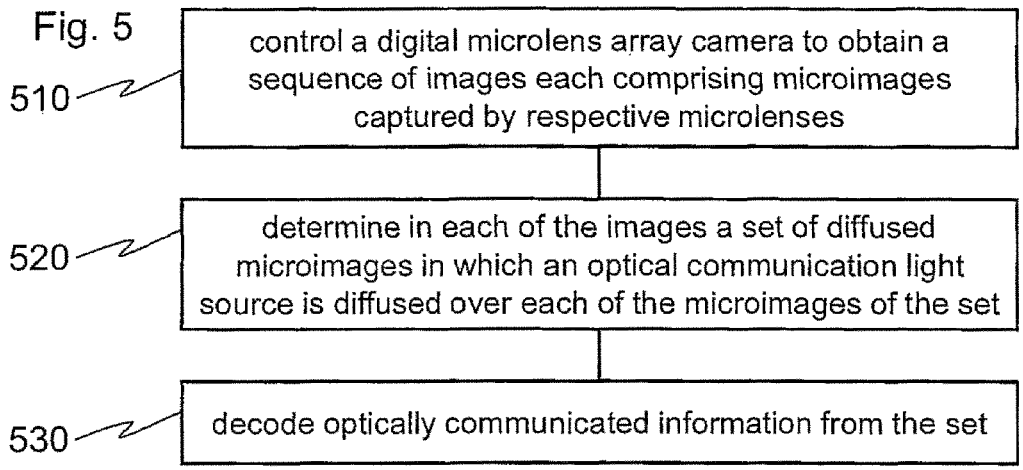
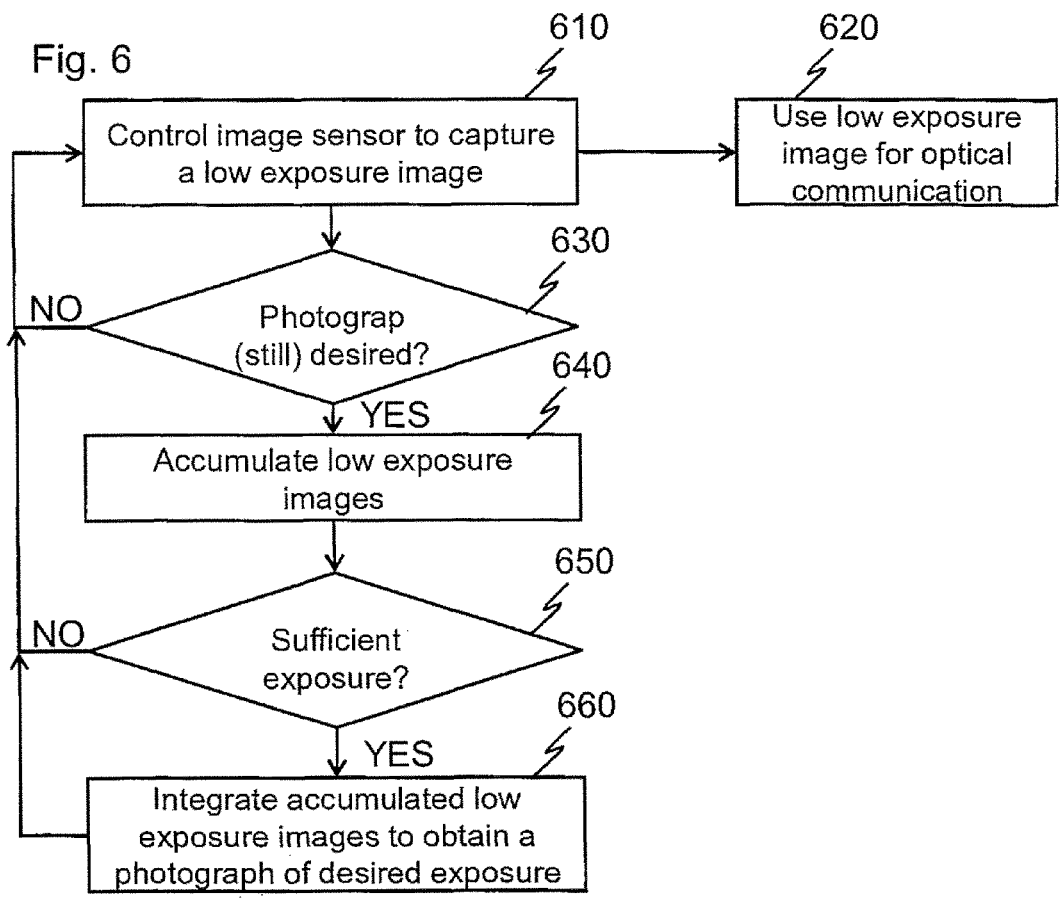

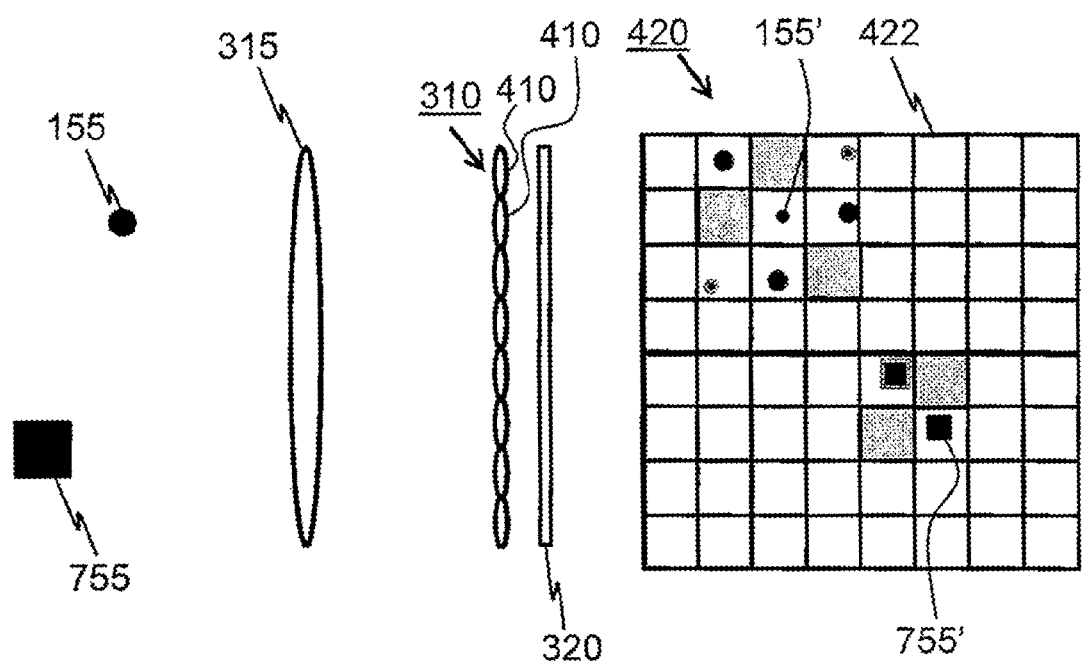

METHOD AND APPARATUS FOR OPTICAL COMMUNICATION

TECHNICAL FIELD

The present application generally relates to optical communication. The present application relates in particular, though not exclusively, to wireless optical communication.

BACKGROUND

This section illustrates useful background information without admission of any technique described herein representative of the state of the art.

There are numerous different media for wireless communication. Radio signals can be used with a plethora of different modulation schemes. There are also numerous acoustic communication methods and infrared data transfer systems such as usual remote controller systems. Visible light can also be used to transfer information using particular transmitters and receivers such as light detectors.

SUMMARY

Various aspects of examples of the invention are set out in the claims.

According to a first example aspect of the present invention, there is provided a method comprising:

controlling a digital microlens array camera to obtain a sequence of images each comprising microimages captured by respective microlenses;

determining in each of the images a set of diffused microimages in which an optical communication light source is diffused over each of the microimages of the set; and decoding optically communicated information from the set.

The term microimage may refer to a sub-image produced on the image sensor by one of the microlenses.

The term microlens may refer to a unit in a group or grid of lenslets that are configured to produce corresponding microimages on the image sensor.

The set may comprise microimages produced by all the microlenses of the microlens array camera. The method may comprise controlling a focus lens to defocus all of the microlenses with respect to the optical communication light source.

The set may be a subset of the microimages produced by the microlenses of the microlens array camera. The microlenses may have varying focusing planes. The method may comprise determining the set to comprise the microimages that comprise the optical communication light source and that are out of focus with respect to the optical communication light source.

The method may comprise controlling the digital microlens camera to capture a plurality of low exposure image frames and joining the low exposure image frames to form photographs of desired exposure. The decoding of the optically communicated information may be performed using the low exposure image frames.

The method may comprise simultaneously decoding optically communicated information from the set and capturing one or more focused microimages with microlenses other than those of the set.

The method may comprise detecting plurality of different optical communication light sources that appear simultaneously in the images. The method may comprise determining for each of the plurality of the simultaneously appearing different optical communication light sources a respective set of diffused microimages in which the optical communication light source in question is diffused over each of the microimages of the respective set. The method may comprise decoding optically communicated information from the respective set for each of the plurality of the simultaneously appearing different optical communication light sources. The decoding of the optically communicated information may employ different communication protocols and/or data rates for different optical communication light sources.

The method may comprise controlling the digital microlens array camera to obtain a sequence of images such that for some of the images, only such read-out lines are exposed that are needed for producing the set of diffused microimages.

The method may comprise controlling the digital microlens array camera to defocus all of the microlenses with respect to the optical communication light source during a first period of time and then controlling the digital microlens array camera to defocus only a subset of the microlenses in response to that at least one condition is met. The at least one condition may comprise any one or more of: detecting a need to capture a photographic image with the digital microlens array camera; detecting that the decoding of the optically communicated information can be performed using only a defocused subset of the microlenses; detecting that the decoding of the optically communicated information from the set is no longer desired; and detecting that the decoding of the optically communicated information from the set is not successful.

The optical communication light source may be an illuminator. Alternatively, the optical communication light source may be a reflection. The optical communication light source may alternatingly appear directly to the camera and by reflection.

The digital microlens array camera may be formed using a digital camera and of an add-on microlens array. Alternatively, the microlens array camera may comprise a pre-installed microlens array configured to form microimages on the image sensor of the digital microlens array camera.

According to a second example aspect of the present invention, there is provided an apparatus comprising:

an interface configured to exchange information with an image sensor of a digital microlens array camera; and a processor configured to control the digital microlens array camera over the interface to obtain a sequence of images each comprising microimages captured by respective microlenses;

wherein the processor is further configured to determine in each of the images a set of diffused microimages in which an optical communication light source is diffused over each of the microimages of the set; and wherein the processor is further configured to decode optically communicated information from the set.

According to a third example aspect of the present invention, there is provided a computer program comprising computer executable program code configured to execute the method of the first example aspect.

The computer program may be stored in a computer readable memory medium.

According to a fourth example aspect of the present invention, there is provided an apparatus comprising:

means for controlling a digital microlens array camera to obtain a sequence of images each comprising microimages captured by respective microlenses;

means for determining in each of the images a set of diffused microimages in which an optical communication light source is diffused over each of the microimages of the set; and means for decoding optically communicated information from the set.

The set may comprise microimages produced by all the microlenses of the microlens array camera. The apparatus may comprise a focus lens configured to defocus all of the microlenses with respect to the optical communication light source.

The set may be a subset of the microimages produced by the microlenses of the microlens array camera. The microlenses may have varying focusing planes. The apparatus may comprise means for determining the set to comprise the microimages that comprise the optical communication light source and that are out of focus with respect to the optical communication light source.

The apparatus may comprise means for controlling the digital microlens camera to capture a plurality of low exposure image frames and joining the low exposure image frames to form photographs of desired exposure. The apparatus may comprise means for performing the decoding of the optically communicated information using the low exposure image frames.

The apparatus may comprise means for simultaneously decoding optically communicated information from the set and capturing one or more focused microimages with microlenses other than those of the set.

The apparatus may comprise means for detecting plurality of different optical communication light sources that appear simultaneously in the images. The apparatus may comprise means for determining for each of the plurality of the simultaneously appearing different optical communication light sources a respective set of diffused microimages in which the optical communication light source in question is diffused over each of the microimages of the respective set. The apparatus may comprise means for decoding optically communicated information from the respective set for each of the plurality of the simultaneously appearing different optical communication light sources. The decoding of the optically communicated information may employ different communication protocols and/or data rates for different optical communication light sources.

The apparatus may comprise means for controlling the digital microlens array camera to obtain a sequence of images such that for some of the images, only such read-out lines are exposed that are needed for producing the set of diffused microimages.

The apparatus may comprise means for controlling the digital microlens array camera to defocus all of the microlenses with respect to the optical communication light source during a first period of time and then controlling the digital microlens array camera to defocus only a subset of the microlenses in response to that at least one condition is met. The at least one condition may comprise any one or more of: detecting a need to capture a photographic image with the digital microlens array camera; detecting that the decoding of the optically communicated information can be performed using only a defocused subset of the microlenses; detecting that the decoding of the optically communicated information from the set is no longer desired; and detecting that the decoding of the optically communicated information from the set is not successful.

The optical communication light source may be an illuminator. Alternatively, the optical communication light source may be a reflection. The optical communication light source may alternatingly appear directly to the camera and by reflection.

The digital microlens array camera may be formed using a digital camera and of an add-on microlens array. Alternatively, the microlens array camera may comprise a pre-installed microlens array configured to form microimages on the image sensor of the digital microlens array camera.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

According to a fifth example aspect of the present invention, there is provided an apparatus comprising a memory and a processor that are configured to cause the apparatus to perform the method of the first example aspect.

According to a sixth example aspect of the present invention, there is provided an apparatus comprising a memory and a processor that are configured to cause the apparatus to perform the method of the second example aspect.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 5 shows a flow chart illustrating a method of an example embodiment;

FIG. 6 shows a flow chart illustrating a method of an example embodiment; and

FIG. 7 shows a schematic drawing illustrating an exaggerated view of some details of a system of an example embodiment of the invention.

DETAILED DESCRIPTION OF THE DRAWINGS

An example embodiment of the present invention and its potential advantages are understood by referring to FIGS. 1 through 7 of the drawings. In this document, like reference signs denote like parts or steps.

Figure 1:
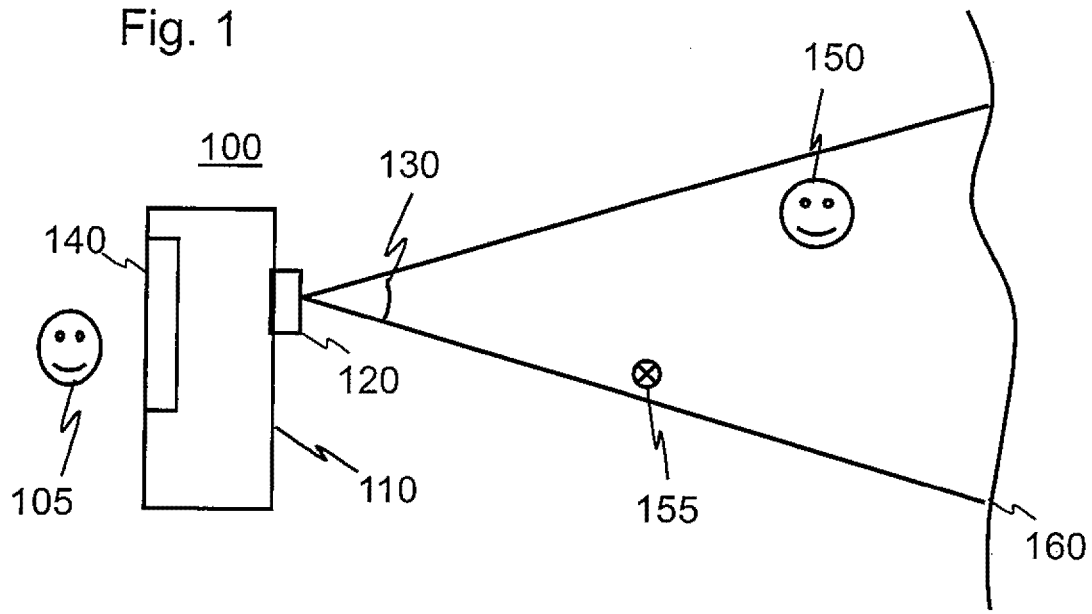
FIG. 1 shows a schematic system for use as a reference with which some example embodiments of the invention can be explained.
Figure 2:
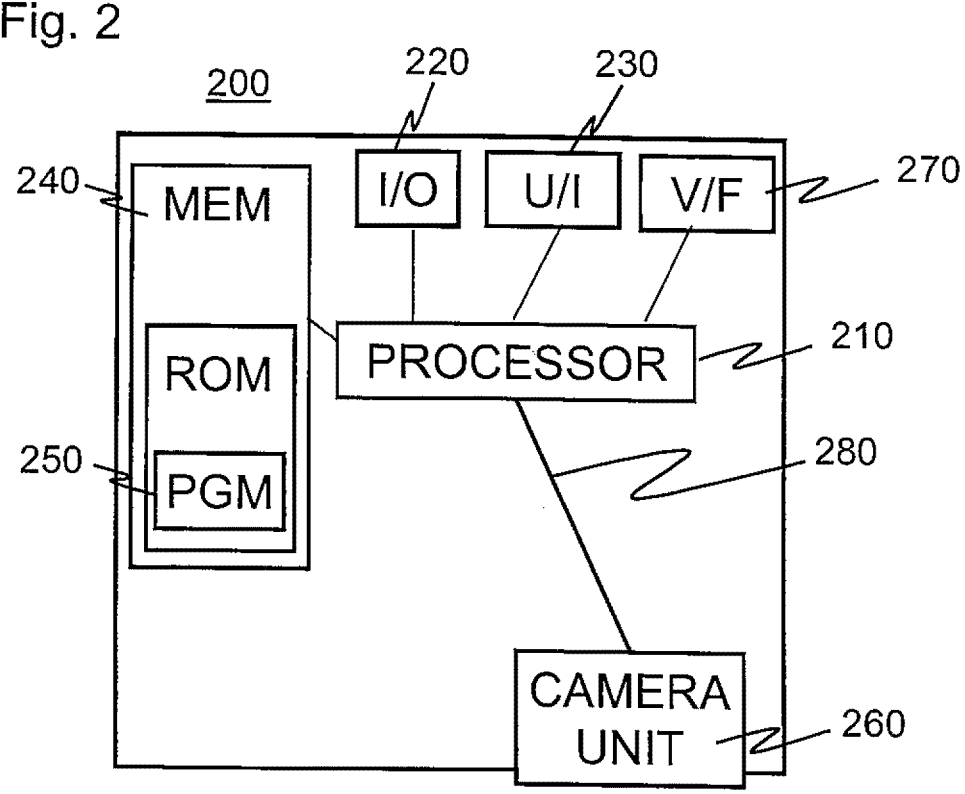
FIG. 2 shows a block diagram of an imaging apparatus of an example embodiment of the invention.
Figure 3:
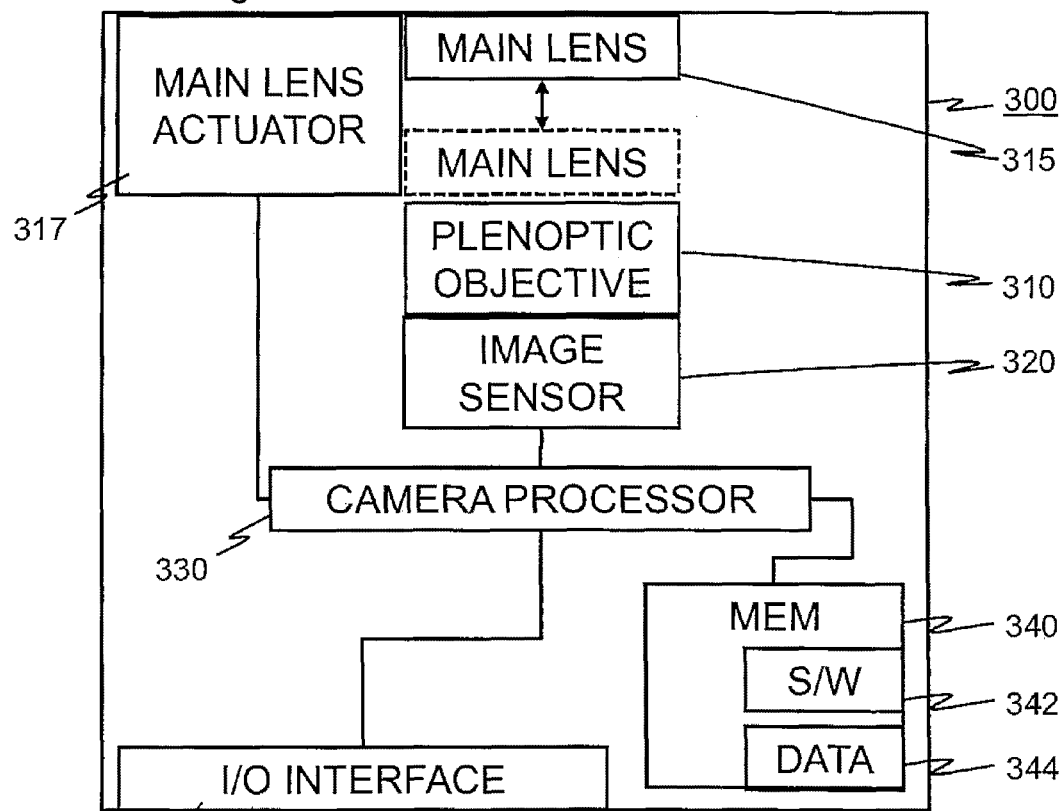
FIG. 3 shows a block diagram of an imaging unit of an example embodiment of the invention.
Figure 4:
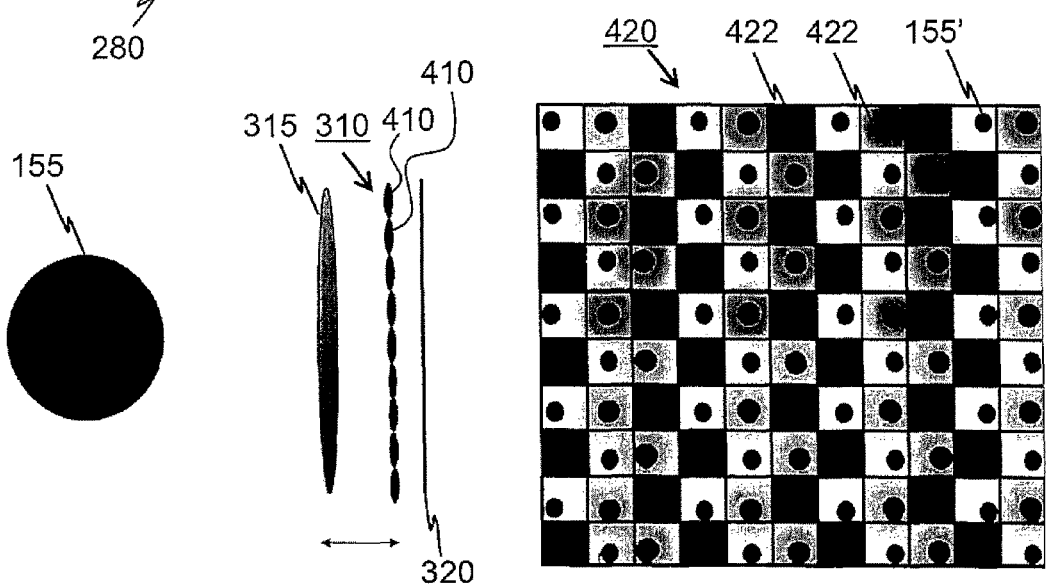
FIG. 4 shows a schematic drawing illustrating an exaggerated view of some details of a system of an example embodiment of the invention.

FIGS. 1 to 3 are drawn to help describing an environment and equipment of some example embodiments of the invention. FIG. 4 onwards illustrate processes and particular details of equipment of some example embodiments.

FIG. 1 shows a schematic system 100 for use as a reference with which some example embodiments of the invention can be explained. The system 100 comprises a device 110 such as a camera phone, gaming device, security camera device, personal digital assistant, tablet computer or a digital camera having an imaging unit 120 with a field of view 130. The device 110 further comprises a display 140. FIG. 1 also shows a user 105 and an image object 150 that is being imaged by the imaging unit 120 and a background 160.

FIG. 1 also shows a secondary object that is an optical communication light source 155. While this setting is not by any means necessary, it serves to simplify FIG. 1 and description of some example embodiments of the invention. The objects and the background collectively form a scene that is seen by the imaging unit 120 in its field of view 130.

The optical communication light source 155 is generally a source in the sense that the camera sees an optical communication signal arriving from the optical communication light source 155. The optical communication light source 155 may be an illuminator of an optical communication transmitter. Alternatively, the optical communication light source 155 may be a reflection. It is also possible that sometimes, the optical communication light source 155 is formed by an illuminator that is directly visible to the camera and sometimes the optical communication light source is formed by reflection of such an illuminator.

FIG. 2 shows a block diagram of an imaging apparatus 200 of an example embodiment of the invention. The imaging apparatus 200 is suited for operating as the device 110. The apparatus 200 comprises a communication interface 220, a host processor 210 coupled to the communication interface module 220, and a user interface 230 and a memory 240 coupled to the host processor 210.

The memory 240 comprises a work memory and a non-volatile memory such as a read-only memory, flash memory, optical or magnetic memory. In the memory 240, typically at least initially in the non-volatile memory, there is stored software 250 operable to be loaded and executed by the host processor 210. The software 250 may comprise one or more software modules and can be in the form of a computer program product that is software stored in a memory medium. The imaging apparatus 200 further comprises a digital image capture unit 260 and a viewfinder 270 each coupled to the host processor 210. The viewfinder 270 is implemented in an example embodiment by using a display configured to show a live camera view. The digital image capture unit 260 and the processor 210 are connected via a camera interface 280.

Term host processor refers to a processor in the apparatus 200 in distinction of one or more processors in the digital image capture unit 260, referred to as camera processor(s) 330 in FIG. 3. Depending on implementation, different example embodiments of the invention share processing of image information and control of the imaging unit 300 differently. Also, the processing is performed on the fly in one example embodiment and with off-line processing in another example embodiment. It is also possible that a given amount of images or image information can be processed on the fly and after that off-line operation mode is used as in one example embodiment. The on the fly operation refers e.g. to such real-time or near real-time operation that occurs in pace with taking images and that typically also is completed before next image can be taken.

In an example embodiment, the camera processor 330 is referred to as a controller and the host processor is simply referred to as a processor.

It shall be understood that any coupling in this document refers to functional or operational coupling; there may be intervening components or circuitries in between coupled elements.

The communication interface module 220 is configured to provide local communications over one or more local links. The links may be wired and/or wireless links. The communication interface 220 may further or alternatively implement telecommunication links suited for establishing links with other users or for data transfer (e.g. using the Internet). Such telecommunication links may be links using any of: wireless local area network links, Bluetooth, ultra-wide-band, cellular or satellite communication links. The communication interface 220 may be integrated into the apparatus 200 or into an adapter, card or the like that may be inserted into a suitable slot or port of the apparatus 200. While FIG. 2 shows one communication interface 220, the apparatus may comprise a plurality of communication interfaces 220.

Any processor mentioned in this document is selected, for instance, from a group consisting of at least one of the following: a central processing unit (CPU), a microprocessor, a digital signal processor (DSP), a graphics processing unit, an application specific integrated circuit (ASIC), a field programmable gate array, a microcontroller, and any number of and any a combination thereof. FIG. 2 shows one host processor 210, but the apparatus 200 may comprise a plurality of host processors.

As mentioned in the foregoing, the memory 240 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. In some example embodiments, only volatile or non-volatile memory is present in the apparatus 200. Moreover, in some example embodiments, the apparatus comprises a plurality of memories. In some example embodiments, various elements are integrated. For instance, the memory 240 can be constructed as a part of the apparatus 200 or inserted into a slot, port, or the like. Further still, the memory 240 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 200 may comprise other elements, such as microphones, displays, as well as additional circuitry such as further input/output (I/O) circuitries, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 200 may comprise a disposable or rechargeable battery (not shown) for powering the apparatus when external power if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In one example embodiment term apparatus refers to the processor 210, an input of the processor 210 configured to receive information from the digital image capture unit 260 and an output of the processor 210 configured to provide information to the viewfinder. For instance, the image processor may comprise the processor 210 and the device in question may comprise the camera processor 330 and the camera interface 280 shown in FIG. 3.

FIG. 3 shows a block diagram of an imaging unit 300 of an example embodiment of the invention. The digital image capture unit 300 comprises a microarray lens objective 310 such as a plenoptic objective, a moveable main lens 315 and its actuator 317, and an image sensor 320 corresponding to the objective 310, a camera processor 330, a memory 340 comprising data such as user settings 344 and software 342 with which the camera processor 330 can manage operations of the imaging unit 300.

In an example embodiment, the plenoptic objective 310 comprises N groups of microlenses or lenslets. The microlenses of each group may have matching focal lengths. In an example embodiment, the N groups of microlenses are intertwined or mixed such that microlenses of each of the N groups are configured to produce microimages across entire imaging area of the image sensor. N may be 2, 3, 4, 5, 6, 7, 8, 9, 10 or greater than 10.

The camera processor 330 operates as an image processing circuitry of an example embodiment. An input/output or camera interface 280 is also provided to enable exchange of information between the imaging unit 300 and the host processor 210. The image sensor 320 is, for instance, a CCD or CMOS unit. In case of a CMOS unit, the image sensor 320 can also contain built-in analog-to-digital implemented on common silicon chip with the image sensor 320. In an alternative example embodiment, a separate A/D conversion is provided between the image sensor 320 and the camera processor 330. In an example embodiment, the image sensor 320 comprises a global shutter.

The camera processor 330 takes care in particular example embodiments of one or more of the following functions: digital image stabilization; pixel color interpolation; white balance correction; edge enhancement; aspect ratio control; vignetting correction; combining of subsequent images for high dynamic range imaging; Bayer reconstruction filtering; chromatic aberration correction; dust effect compensation; and downscaling images; and pulsed illumination of the scene.

In an example embodiment, the camera processor 330 performs little or no processing at all. The camera processor 330 is entirely omitted in an example embodiment in which the imaging unit 300 merely forms digitized images for subsequent processing e.g. by the host processor 210. For most of the following description, the processing can be performed using the camera processor 330, the host processor 210, their combination or any other processor or processors.

FIG. 4 shows a schematic drawing illustrating an exaggerated view of the optical communication light source 155, the main lens 315, microlens array 310 (showing also a number of microlenses 410), the image sensor 320 and an image 420 formed on the image sensor 320, illustrating a number of microimages 422 and how the optical communication light source 155 appears differently in these microimages 422 depending on the focusing of the respective microlenses 410.

In an example embodiment, the microlens array 310 is configured to produce the microimages with a number of focal distances e.g. for light-field imaging. Such imaging may enable e.g. that the user can virtually change the focusing of a photograph after the picture has been taken so that the image is produced from another microimage or set of microimages. That is, the microlens array 310 may comprise a plurality of groups of microlenses of given focal distances. In FIG. 4, the groups are intertwined such that substantially over the entire image, there are some microimages that are entirely out of focus (there is no perceivable circle representing the optical communication light source 155 that is the sole image object of FIG. 4), some microimages 422 that are perfectly focused (with respect to the optical communication light source 155) and some microimages 422 that are partly focused with that respect.

FIG. 5 shows a flow chart illustrating a method of an example embodiment. The method comprises controlling 510 a digital microlens array camera to obtain a sequence of images each comprising microimages captured by respective microlenses; determining 520 in each of the images a set of diffused microimages in which an optical communication light source is diffused over each of the microimages of the set; and decoding 530 optically communicated information from the set.

The decoding 530 may operate using, for example, on-off-keying, pulse width modulation, pseudo-noise code modulation, or any other known modulation technique. In one example embodiment, the decoding 530 detects variations of brightness or amplitude of a signal sent by the optical communication light source 155. The decoding can be performed at simplest such that it is merely detected whether the optical communication light source 155 is on or off, but in another example embodiment, the amplitude level is distinguished from three, four or more different levels. It is also possible to use or combine frequency i.e. color based variation to convey greater data bandwidth in the optical communication.

In an example embodiment, a reverse link (not shown) is arranged between the recipient of the optical communication and the transmitter of the optical communication. The reverse link may be a wireless link such as an optical link, an acoustic link, and/or a radio link. The reverse link may be used e.g. for flow control. For example, the reverse link may be used to adapt the data rate, modulation method and to request for retransmissions and/or to acknowledge successfully received data packets.

In an example embodiment, the set comprises all the microlenses of the microlens array camera. Then, the entire image can be diffused e.g. by moving a focus lens (e.g. the main lens 315) so that all the microimages become defocused with respect to the optical communication light source. In this case, the determining 520 of the set of diffused microimages may be simply performed by assuming that all the microimages are diffused. See e.g. FIG. 4 and assume that the focus lens or main lens 315 were brought too close or too far from the microlens array 310: all the microimages would become defocused. In an alternative example embodiment, some of the microlenses are diffusing elements so that their microimages are always diffuse. In this case, the determination of the set of diffused microimages can be simply determining such one or more microimages as the set. Such always diffuse microimage or microimages can also be used for computationally light determining of white balance. In yet another example embodiment, the microlenses configured such that for all distances, some of the microlenses are sufficiently out of focus to produce diffused microimages.

In an example embodiment, the set is a subset of the microlenses of the microlens array camera. The set may be determined to comprise the microimages which comprise the optical communication light source and that are out of focus with respect to the optical communication light source. For example, in the example of FIG. 4, the subset can be determined to comprise the microimages that are drawn as black boxes in illustration that the optical communication light source is diffused over the entire microimages in question.

In an example embodiment, the digital microlens camera is controlled to capture a plurality of low exposure image frames and joining the low exposure image frames to form photographs of desired exposure. In an example embodiment, the decoding of the optically communicated information is performed using the low exposure image frames.

FIG. 6 shows a flow chart illustrating a method of an example embodiment. The method comprises controlling 610 an image sensor to capture a low exposure image i.e. to take an image with a shortened exposure time with comparison to that normally used for taking a photograph under prevailing conditions (e.g. with given ambient light, aperture, focal distance and sensitivity such as ISO value of the image sensor). The low exposure image is used 620 for optical communication. In parallel with the use 620 of the low exposure image for optical communication, it is checked 630 if a photograph is desired or the capture of a photograph is under progress. If no, the operation resumes to step 610, otherwise low exposure images are being accumulated 640 and it is checked 650 if sufficient exposure is reached for the photograph. If no, the process resumes to step 610 for capturing yet another low exposure image for accumulating to the photograph, otherwise the accumulated low exposure images are integrated 660 to obtain the photograph with desired exposure.

FIG. 6 illustrates the process on a logical level; it should be realized that in terms of timing, for example, the capture of the low exposure images can be continuously performed regardless whether any of the other steps of the method are taken.

In an example embodiment, the exposure time is dynamically set for the low exposure images so that a desired optical communication data rate can be achieved. In another example embodiment, the exposure time is constantly set for the low exposure images so that a desired optical communication data rate can be achieved.

In an example embodiment, optically communicated information is decoded from the set simultaneously with capturing one or more focused microimages with microlenses other than those used for forming the microimages of the set. For example, looking at FIGS. 4 and 6, it is understood that some microimages can be defocused such that they are well suited for receiving optically communicated information while focused microimages can be used for the capturing of an image or images.

In an example embodiment, there is provided detecting plurality of different optical communication light sources that appear simultaneously in the images. In an example embodiment, there is provided determining for each of the plurality of the simultaneously appearing different optical communication light sources a respective set of diffused microimages in which the optical communication light source in question is diffused over each of the microimages of the respective set. FIG. 7 shows another schematic drawing illustrating two different optical communication light sources, drawn as a circle and rectangle and associated with reference signs 155 and 755, respectively. FIG. 7 is also simplified in that no microimages 422 are drawn to comprise both optical communication light sources. However, even in real life, the different optical communication light sources would likely reside at different distances from the camera and/or laterally so separated that their sharp and diffuse images could be found from different microimages. In an example embodiment, different optical communication light sources are distinguishable by the colors of their transmissions. In such an embodiment, it is possible that one or more microimages would comprise a diffusely spread image of both (or more than two) optical communication light sources. The image sensors typically have the capability of detecting three or more different frequency bands (e.g. red, green and blue). By measuring variations of the different frequency bands, it is possible to simultaneously decode two or more different optical communications from same microimage or microimages.

In an example embodiment, optically communicated information is decoded from the respective set for each of the plurality of the simultaneously appearing different optical communication light sources. In an example embodiment, the decoding of the optically communicated information employs different communication protocols and/or data rates for different optical communication light sources.

In an example embodiment, the digital microlens array camera is controlled to obtain a sequence of images such that for some of the images, only such read-out lines are exposed that are needed for producing the set of diffused microimages. For example, only a fraction (e.g. ½ down to ¹/₁₀₀) of the read-out lines is needed for obtaining the set of diffused microimages that are needed for the optical communication. Using FIG. 7 as an example, it would be possible to decode optical information of the two different optical communication light sources 155, 755 using the read-out lines that correspond e.g. with one or more of the top three rows of microimages and one or more of the fifth and sixth row of microimages, when counting from top down. In that case, these read-out lines can be read more frequently than if the entire image sensor were read and greater data rates can be achieved.

It is also appreciated that even if there were diffuse microimages scattered over the entire image sensor area, the set can be formed from one or more microimages that reside on a single band of read-out lines. The width of the band may match with the height of one microimage. For example, looking at FIG. 4, the set could be formed using the fifth row of microimages, when counted from the top, so that the set would consist of the three diffused (black) microimages. In another example embodiment, the set could consist of solely the microimage in the center of the image sensor. In yet another example embodiment, the set is formed of one or more microimages in which the optical communication light source appears most diffuse i.e. variations in a characteristic of the optical communication light source are the smallest. The characteristic may be, for example, the brightness in the color of the optical communication light source.

A method of one example embodiment comprises controlling the digital microlens array camera to defocus all of the microlenses with respect to the optical communication light source during a first period of time and then controlling the digital microlens array camera to defocus only a subset of the microlenses in response to that at least one condition is met. The at least one condition may comprise any one or more of: detecting a need to capture a photographic image with the digital microlens array camera; detecting that the decoding of the optically communicated information can be performed using only a defocused subset of the microlenses;

detecting that the decoding of the optically communicated information from the set is no longer desired; and detecting that the decoding of the optically communicated information from the set is not successful.

In an example embodiment, the digital microlens array camera is formed using a digital camera and of an add-on microlens array. In another example embodiment, the microlens array camera comprises a pre-installed microlens array configured to form microimages on the image sensor of the digital microlens array camera.

Without in any way limiting the scope, interpretation, or application of the claims appearing below, a technical effect of one or more of the example embodiments disclosed herein is that optical data reception can be performed with a digital microlens array camera without need for a diffuser. Another technical effect of one or more of the example embodiments disclosed herein is that the image sensor of the digital microlens array camera may be employed for optical communication also while capturing photographs. Another technical effect of one or more of the example embodiments disclosed herein is that the image sensor of the digital microlens array camera may be employed for optical communication with a plurality of optical communication transmitters, optionally while capturing photographs.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

We claim:

1. A method comprising:
   controlling a digital microlens array camera to obtain a sequence of images each comprising microimages captured by respective microlenses;
   determining in each of the images a set of diffused microimages in which an optical communication light source is diffused over each of the microimages of the set;
   decoding optically communicated information from the set; and
   determining the set to comprise the microimages that comprise the optical communication light source and that are out of focus with respect to the optical communication light source.

2. The method of claim 1, wherein the set is a subset of the microimages produced by the microlenses of the microlens array camera.

3. The method of claim 1, wherein the microlenses have varying focusing planes.

4. The method of claim 1, wherein the set comprises microimages produced by all the microlenses of the microlens array camera.

5. The method of claim 4, further comprising controlling a focus lens to defocus all of the microlenses with respect to the optical communication light source.

6. The method of claim 1, further comprising controlling the digital microlens camera to capture a plurality of low exposure image frames and joining the low exposure image frames to form photographs of desired exposure.

7. The method of claim 6, wherein the decoding of the optically communicated information is performed using the low exposure image frames.

8. The method of claim 1, comprising simultaneously decoding optically communicated information from the set and capturing one or more focused microimages with microlenses other than those of the set.

9. The method of claim 8, comprising detecting plurality of different optical communication light sources that appear simultaneously in the images.

10. The method of claim 8, comprising determining for each of the plurality of the simultaneously appearing different optical communication light sources a respective set of diffused microimages in which the optical communication light source in question is diffused over each of the microimages of the respective set.

11. The method of claim 8, comprising decoding optically communicated information from the respective set for each of the plurality of the simultaneously appearing different optical communication light sources.

12. The method of claim 1, comprising controlling the digital microlens array camera to obtain a sequence of images such that for some of the images, only such read-out lines are exposed that are needed for producing the set of diffused microimages.

13. The method of claim 1, comprising controlling the digital microlens array camera to defocus all of the microlenses with respect to the optical communication light source during a first period of time and then controlling the digital microlens array camera to defocus only a subset of the microlenses in response to that at least one condition is met.

14. The method of claim 13, wherein the at least one condition comprises any one or more of: detecting a need to capture a photographic image with the digital microlens array camera; detecting that the decoding of the optically communicated information can be performed using only a defocused subset of the microlenses; detecting that the decoding of the optically communicated information from the set is no longer desired; and detecting that the decoding of the optically communicated information from the set is not successful.

15. An apparatus comprising
   an interface configured to exchange information with an image sensor of a digital microlens array camera; and a processor configured to control the digital microlens array camera over the interface to obtain a sequence of images each comprising microimages captured by respective microlenses;

wherein the processor is further configured to determine in each of the images a set of diffused microimages in which an optical communication light source is diffused over each of the microimages of the set;

wherein the processor is further configured to decode optically communicated information from the set; and wherein the processor is further configured to determine the set to comprise the microimages that comprise the optical communication light source and that are out of focus with respect to the optical communication light source.

16. The apparatus of claim 15, wherein the processor is configured to perform a method comprising: controlling a digital microlens array camera to obtain a sequence of images each comprising microimages captured by respective microlenses; determining in each of the images a set of diffused microimages in which an optical communication light source is diffused over each of the microimages of the set; and decoding optically communicated information from the set.

17. A non-transitory computer program storage device comprising computer executable program code configured to execute a method comprising:

controlling a digital microlens array camera to obtain a sequence of images each comprising microimages captured by respective microlenses;

determining in each of the images a set of diffused microimages in which an optical communication light source is diffused over each of the microimages of the set;

decoding optically communicated information from the set; and determining the set to comprise the microimages that comprise the optical communication light source and that are out of focus with respect to the optical communication light source.

* * * * *